United States Patent [19]
Phillips

[11] 3,734,114
[45] May 22, 1973

[54] ADJUSTABLE DAMPER VALVE

[75] Inventor: Leonard R. Phillips, Westfield, Mass.

[73] Assignee: Sterling Radiator Company, Inc., Westfield, Mass.

[22] Filed: Jan. 5, 1972

[21] Appl. No.: 215,464

[52] U.S. Cl. .......................... 137/68, 98/86, 137/77, 160/1, 160/84 R
[51] Int. Cl. ......................... F16k 17/40, E05f 15/20
[58] Field of Search .................. 98/1, 86; 126/287.5; 137/67–77; 160/1, 84 R; 251/DIG. 2, 326

[56] References Cited
UNITED STATES PATENTS

| | | | |
|---|---|---|---|
| 1,082,107 | 12/1913 | Carlson | 137/75 |
| 1,892,921 | 1/1933 | White | 137/75 |
| 3,015,337 | 1/1962 | Hookway | 137/75 |
| 3,460,458 | 8/1969 | MacLeod | 160/84 R |
| 3,495,606 | 2/1970 | Phillips | 137/75 |

Primary Examiner—Martin P. Schwadron
Assistant Examiner—Richard Gerard
Attorney—John C. Linderman

[57] ABSTRACT

An adjustable damper valve having a housing forming an axially extending passageway utilizes a resilient metallic shutter containing a plurality of pleat-type folds to permit the shutter to expand transversely across the passageway and close a ventilating duct. An adjustable platform bearing a bracket that is pivotable into or out of engagement with the metallic shutter is mounted on a lead screw that may be rotated to adjust the transverse position of the bracket in the passageway and correspondingly limit the resilient expansion of the shutter across the passageway. The bracket is held in engagement with the metallic shutter by means of a frangible link which when broken permits the bracket to pivot relative to the adjustable platform and out of engagement with the shutter so that the shutter can completely close the passageway. Several frangible links responsive to different conditions are connected serially together to hold the bracket so that the shutter closes automatically when a condition to which any one of the links is sensitive is present.

12 Claims, 4 Drawing Figures

3,734,114

ADJUSTABLE DAMPER VALVE

BACKGROUND OF THE INVENTION

The present invention relates to the field of damper valves of the type used in ventilating ducts or chimneys for controlling the flow of gaseous fluids through the ducts. More particularly, the invention is concerned with a damper valve that is adjustably positioned within the duct to regulate the flow of gases and which at the same time is adapted to automatically and rapidly close the duct completely in the presence of an unsafe condition such as fire or smoke.

Damper valves which may be manually adjusted in a duct by external means and valves which automatically close in the presence of an unsafe condition are disclosed in my previously issued U.S. Pat. No. 3,495,606 entitled "Damper Valve for Ventilating Ducts" and having the same assignee as the present invention. The valves disclosed in the patent utilize a pleated metallic damper member or shutter which expands resiliently across a passageway to impede or entirely prevent the flow of gaseous fluids through the passageway. Various embodiments of the damper valve individually provide either a manual adjustment capability or an automatic closing feature for emergency situations such as a fire or heavy smoke condition. Although separate valves, one being manually adjustable and another being automatically responsive to an emergency condition, can be placed serially in the same duct to perform their individual functions, it is desirable from a cost and space saving standpoint to utilize only one valve to perform both functions.

It is, accordingly, a general object of the present invention to disclose a damper valve which is manually adjustable to regulate the flow of gas through the duct as desired and which at the same time possesses the capability of automatically closing the duct in the presence of an emergency condition regardless of the adjustment of the shutter at the time the emergency condition arises.

SUMMARY OF THE INVENTION

The present invention resides in an adjustable damper valve adapted to automatically close in the presence of a given condition. The damper valve comprises a housing defining an axially extending passageway through which a gaseous fluid may be conducted in the open position of the valve. A resilient, folding shutter or baffle is provided to open and close the passageway. The shutter has a mounting portion connected to a mounting point on the housing and a folding portion movable between an unfolded or expanded position closing the passageway, and a folded or collapsed position opening the passageway. In the unfolded position the shutter extends from the mounting point transversely across the passageway to impede the flow of gas and in the folded position, the shutter is compressed and collapsed adjacent the mounting point to permit gas flow. An adjustable platform mounted axially adjacent the folding portion of the shutter is variably positioned transversely in the passageway by means of a lead screw. The lead screw extends parallel to the folding portion and permits parallel movement of the platform as the folding portion moves between the folded and unfolded positions. A shutter support bracket mounted to the adjustable platform for movement with the platform transversely of the passageway is movable relative to the platform between a first position in which the bracket engages the folding portion of the shutter and constrains the transverse movement of the shutter and a second position in which the bracket and shutter are disengaged so that the folding portion is permitted to expand freely across the passageway. A frangible link connected between the adjustable platform and the shutter support bracket holds the bracket in the first position until a given condition, such as an elevated temperature, to which the link is sensitive occurs. In the presence of such a condition the link breaks and permits the shutter support bracket to move away from the shutter and the folding portion then expands completely across the fluid passageway. The adjustable platform, therefore, permits the shutter position in the passageway to be adjusted as desired and the movable support bracket and frangible link move out of engagement with the shutter to close the passageway completely in an emergency situation.

DESCRIPTION OF THE PREFERRED EMBODIMENTS

Figure 1:
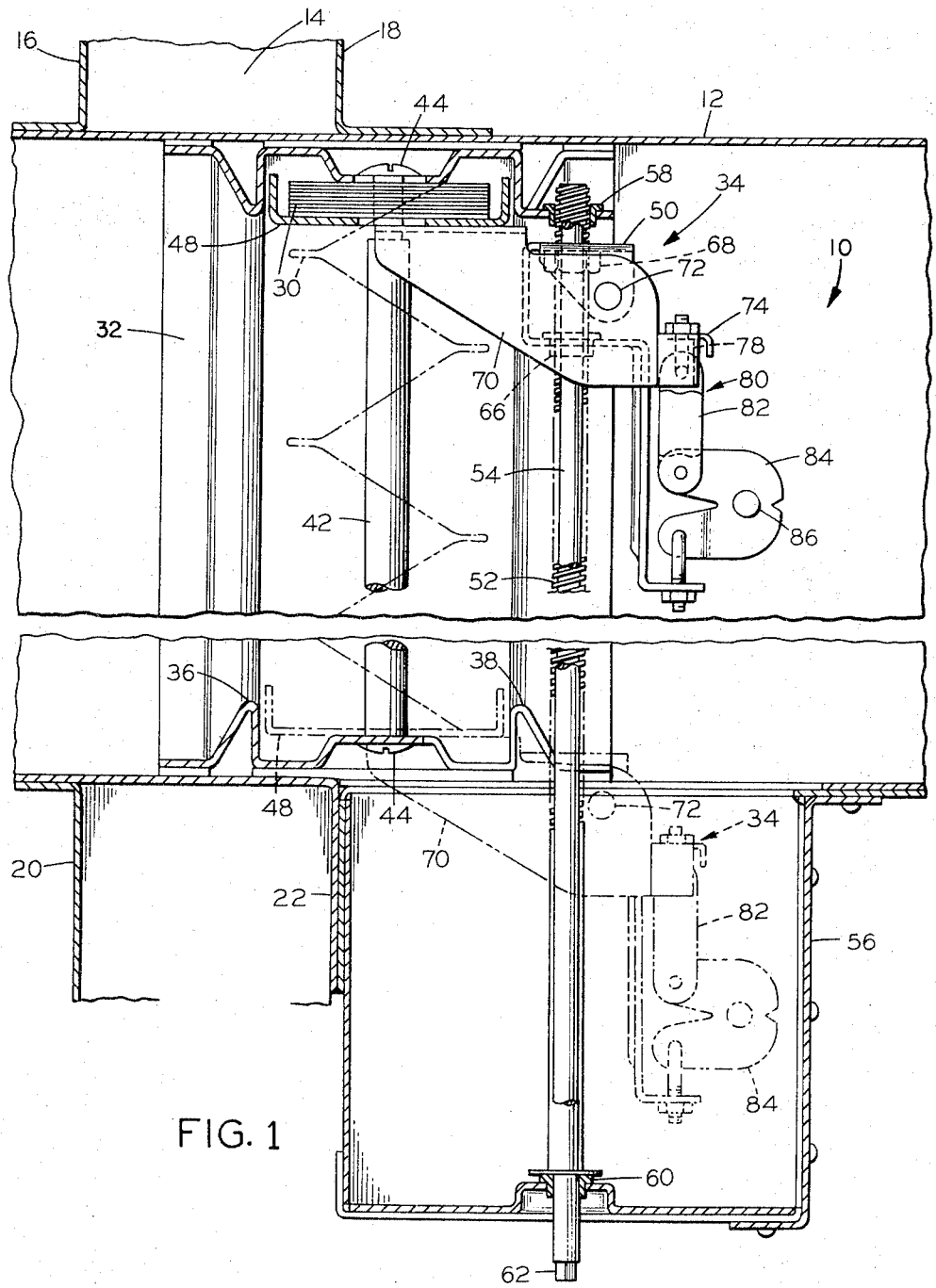
FIG. 1 is a longitudinal section through a fluid duct containing a damper valve embodying the present invention.
Figure 2:
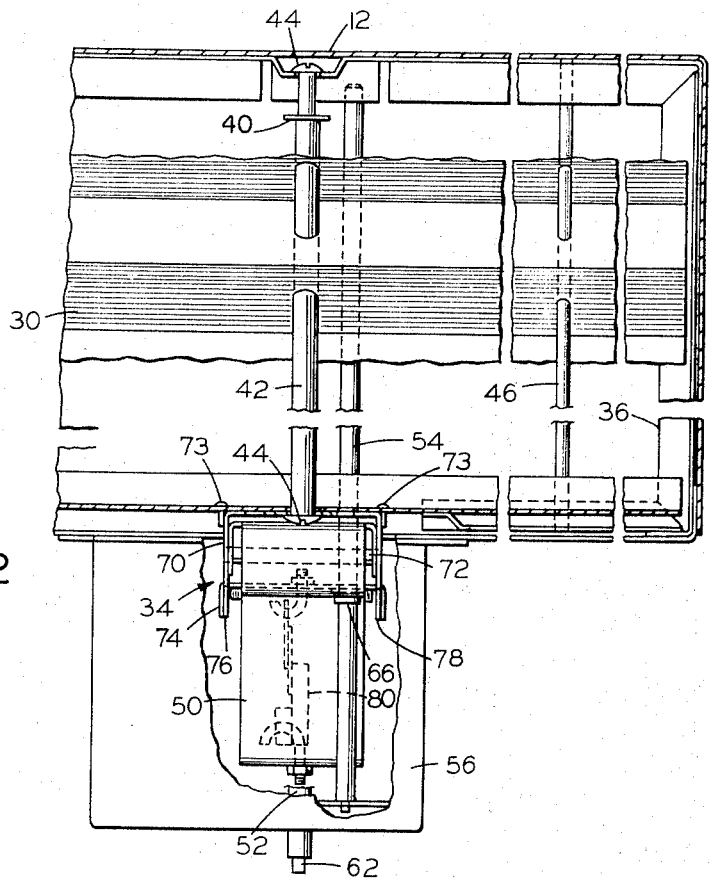
FIG. 2 is a transverse sectional view of the duct in FIG. 1 and shows the damper valve adjusted in its closed position.
Figure 3:
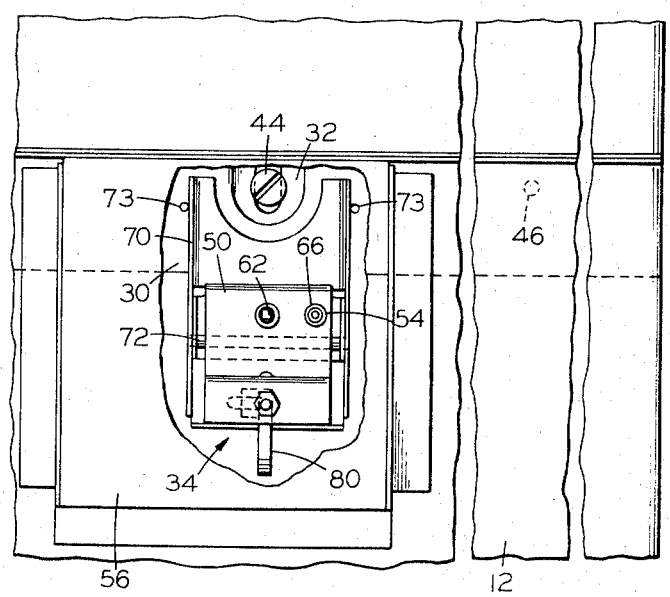
FIG. 3 is a bottom plan view of the duct in FIG. 2 and the adjusting mechanism.

FIGS. 1, 2 and 3 show one embodiment of the adjustable damper valve of the present invention in a three-view projection. The adjustable damper valve, generally designated 10, is located in a ventilating duct 12 which extends through a wall or partition 14 and is secured to the partition by means of three angled fasteners 16, 18 and 20 and a lip 22 formed integrally from the lower wall of the duct 12. As indicated most clearly in FIG. 2, the walls of the duct 12 are arranged at right angles to one another and define a duct and passageway having a rectangular cross section through which ventilating air, flue gases or other gaseous fluids are conducted. The damper valve 10 is comprised principally of a metallic shutter 30 mounted within a rectangular housing or frame 32 and an adjusting mechanism 34 which engages the shutter 30 and controls the opening and closing operation of the shutter.

The housing 32 fits within the walls of the duct 12 and is composed of formed sheet metal pieces which define two axially spaced, rectangular openings 36 and 38 between which the shutter 30 is mounted. The metallic shutter 30 is a resilient, folded shutter having a plurality of pleated or concertina-type folds which permit the shutter to expand or unfold transversely across the passageway from a mounting point at the upper side of the housing 32 as viewed in FIGS. 1 and 2 and to be compressed in a collapsed condition adjacent the mounting point. When the shutter is expanded across the passageway in the duct 12, fluid flow is impeded or all together cut off depending on the adjustment of the shutter. When the shutter is held in its collapsed condition, fluid flows unimpeded through the passageway.

The shutter is preferably formed from a high temperature resistant and resilient sheet material such as a chromium alloy steel or the like and the pleats or folds in the shutter are crimped to a limited degree which causes the shutter in its relaxed condition to assume the expanded position indicated in phantom in FIG. 1.

The attachment of the shutter to the upper side of the housing 32 is accomplished by a washer 40, (FIGS. 2 and 4) a central guide rod 42 extending through the pleats or leaves of the shutter and mounting screws 44 which secure the rod 42 transversely across the axial passageway between the top and bottom sides of the housing 32 and the axial openings 36 and 38. The washer 40 is loosely mounted adjacent the upper end of the guide rod 42 on the screw 44 connecting with the upper end of the rod and is sandwiched between the upper pleat or leaf of the shutter 30 and the upper end of the rod to ensure that the shutter is suspended adjacent the upper side of the housing. The shutter 30 is guided during its movement in a transverse plane perpendicular to the principal axis of the duct 12 by means of the housing 32, the central guide rod 42 and additional guide rods 46 mounted in the housing at stations adjacent the side walls of the duct as indicated in FIG. 2. A U-shaped channel member 48 is joined to the free end of the folding portion of the shutter for reinforcement and engagement with the adjusting mechanism 34.

The adjusting mechanism 34 is comprised of an adjustable platform 50 that is supported in the duct 12 on a transversely extending lead screw 52 and a guide rod 54. Both the lead screw 52 and the guide rod 54 are mounted at their upper ends in the housing 32 and at their lower ends in a cubical control box 56 connected to the lower wall of the duct 12 as seen in FIGS. 1 and 2 so that the screw 52 and rod 54 are parallel to the guide rods 42 and 44 which guide the movement of the shutter 30. The guide rod 54 is held fixedly in the housing 32 and the control box 56. The lead screw 52 is mounted at its ends in bushings 58 and 60 so that it is fixed axially but permitted to rotate with respect to the housing 32 and the duct 12. The lower end of the lead screw bears an adjusting lug 62 to which a socket wrench or handle is connected to rotate the lead screw and adjust the position of the metallic shutter 30 as described in greater detail below.

The adjustable platform 50 has a generally inverted, L-shaped configuration and contains a bushing 66 which slidably engages the guide rod 54 and a nut 68 welded to the platform and threadably engaged with the lead screw 52. Since the guide rod 54 and lead screw 52 are arranged in parallel relationship and extend transversely across the passageway of the duct 12, it will be readily understood that rotation of the lug 62 at the base of the lead screw will cause the adjustable platform 50 to translate along the lead screw to any desired position between the upper wall of the duct 12 and a lower position below the lower wall of the duct in the control box 56. As so constructed and arranged the shutter configuration shown can be conveniently used not only as a fire and smoke damper, but also as a volume control damper. The fire and smoke control function of the shutter is not sacrificed at all by the particular position selected for carrying out the volume control function.

A shutter support bracket 70 is pivotally mounted to the adjustable platform 50 by means of a pivot pin 72 extending transversely of the lead screw 52 and the axial direction of the duct 12. The pivoting bracket 70 projects in cantilever fashion from the pin 72 into engagement with the lower side of the reinforcing channel member 48 at the free end of the shutter 30 so that the projecting end of the bracket at one position relative to the platform 50 lies in the transverse plane in which the shutter moves.

The projecting end of the support bracket 70 is forked or bifurcated as shown in FIG. 3 and is positioned by the adjustable platform 50 at a central station within the duct 12 so that the bifurcations straddle the guide rod 42 when the bracket is in supporting engagement with the shutter. Also, alignment pins 73 hold the shutter 30 laterally aligned in the duct 12 when the shutter is resting on the support bracket 70. The bracket 70, therefore, serves as a limit stop constraining the shutter movement and permits the degree of opening of the shutter to be controlled between the upper and the lower (or phantom) positions in FIG. 1 through movements of the adjustable platform 50 along the lead screw 52.

Figure 4:
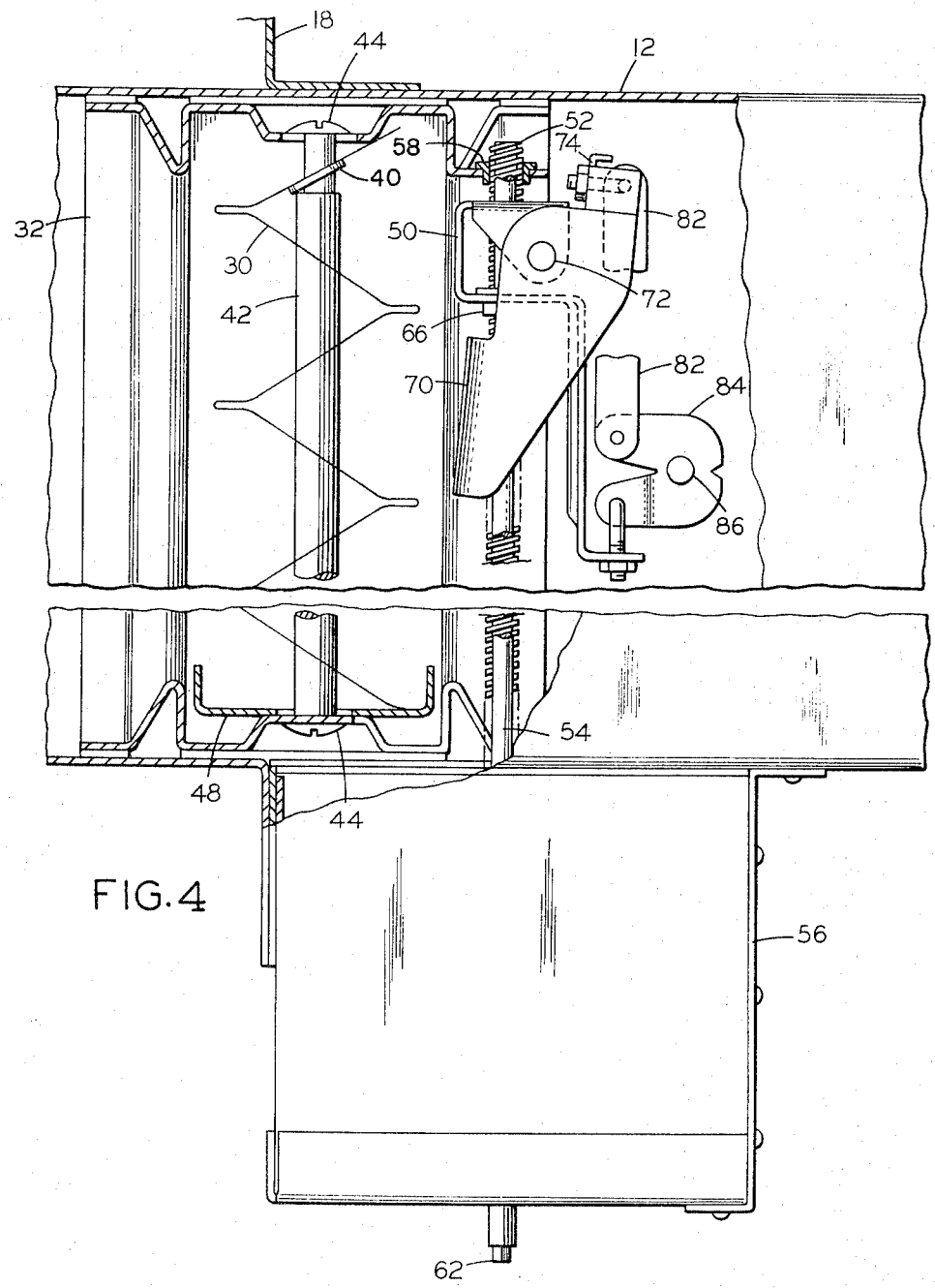
FIG. 4 is a longitudinal sectional view of the duct in FIG. 1 and shows the shutter in the closed position after the frangible link has broken.

A bridging bar 74 is connected across two tangs 76 and 78 integrally formed on the bracket 70 and projecting away from the pivot pin 72 in the direction opposite the portion of the bracket which engages the shutter 30. A retaining linkage 80 comprised of two frangible links 82 and 84 connects between the bar 74 and the depending foot of the adjustable platform 50 to hold the pivoting bracket 70 in contacting engagement with the member 48 on the lower or free end of the shutter. The frangible link 82 is a fusible link which in the presence of elevated temperatures or fire melts to break the linkage 80. The frangible link 84 is an explosive link having a small explosive charge 86 which can be detonated to break the link 84 by means of a sensor (not shown) wired to the charge and located at a position remote from the damper valve 10. The sensor may respond to various types of stimuli, such as smoke, which indicate an unsafe condition requiring that the damper valve be closed. Since the frangible links 82 and 84 are connected serially between the adjustable platform 50 and the bracket 70, when either one of the links breaks as indicated in FIG. 4, the expanding forces of the shutter 30 cause the bracket 70 to pivot relative to the platform 50 out of the transverse plane in which the shutter moves and out of contact with the shutter to the position shown so that the shutter assumes its expanded configuration closing the passageway of the duct 12. It has been found that smoke sensors generally are quite sensitive to the presence of smoke in a building's ventilating system, and that they will cause smoke dampers to close even when a dangerous fire does not exist. This sometimes places a large burden on the building maintenance personnel in that they are expected to reset these dampers in a short period of time. As a result of the depending control or access box 56 shown in this disclosure, it will be apparent that this resetting of the valve is greatly facilitated.

From the above it will be readily apparent that the damper valve 10 is adapted to be manually adjusted to regulate the opening and closing of the duct 12 and to thereby adjust the flow of gaseous fluids through the duct. The damper valve 10 additionally is adapted to automatically close in the event of an unsafe condition such as the presence of elevated temperatures in or around the duct or the presence of smoke detected by a remote sensor connected with the valve. The valve, therefore, can be utilized as both an adjustable damper and a fire damper and precludes the expense and possible difficulties of installing two separate valves for each function.

While the present invention has been disclosed in a preferred embodiment, it will be understood that various modifications and substitutions can be had without departing from the spirit of the invention. Although two frangible links are disclosed, it is readily apparent that a single link or multiple links can be employed. Other means for adjusting the platform 70 can be substituted for the lead screw 52. The shutter support bracket can be varied in shape and may be mounted in various positions for movement into and out of engagement with the shutter. The control box 56 may be advantageously provided with an access door so that the frangible linkage 80 can be repaired or replaced as needed without removing the entire valve and duct from its mounting position in the wall 14. The invention, therefore, has been described in a preferred embodiment by way of illustration rather than limitation.

I claim:

1. An adjustable damper valve adapted to automatically close in the presence of a given condition comprising: a housing defining an axially extending passageway through which a gaseous fluid may be conducted; a resilient, folding shutter having a folding portion movable between an unfolded position in which the resilient shutter is expanded and extended transversely across the passageway to impede the flow of fluid and a folded position in which the shutter is compressed and collapsed within the passageway to permit fluid flow through the passageway; an adjustable platform adjacent the folding portion of the shutter and variably positionable transversely in the passageway in parallel with movement of the folding portion between the folded and unfolded positions; a shutter support bracket mounted from the adjustable platform for movement transversely of the passageway and movable relative to the platform between a first position engaging the folding portion of the resilient shutter and constraining transverse movement of the folding portion to movement with the platform and a second position disengaged from the folding portion of the shutter and permitting transverse movement of the folding portion; and a frangible link connected between the adjustable platform and the shutter support bracket and holding the bracket in the first position constraining movement of the folding portion to movement with platform.

2. An adjustable damper valve as defined in claim 1 wherein a rotatable lead screw and a parallel guide rod for guiding said shutter expansion are mounted to the housing transversely of the passageway; and the adjustable platform is threadably engaged with the lead screw for transverse adjustment in the passageway.

3. An adjustable damper valve as defined in claim 2 wherein the rotatable lead screw is manually rotatable.

4. An adjustable damper valve as defined in claim 1 wherein the shutter support bracket is pivotally mounted to the adjustable platform about a pivot axis perpendicular to the transverse movement of the folding portion of the shutter and the axis of the passageway.

5. An adjustable damper valve as defined in claim 4 wherein the shutter support bracket in the first position has a first portion extending axially of the passageway in cantilever fashion from the pivot axis into contacting engagement with the folding portion of the shutter and the frangible link connects with a second portion of the support bracket on the side of the pivot axis opposite the first portion.

6. An adjustable damper valve having provisions for rapidly closing a duct comprising: a housing having walls defining an axial fluid passageway extending through the housing between oppositely disposed axially openings; a resilient, metallic shutter mounted between the walls of the housing and containing a plurality of pleated folds permitting the shutter to resiliently expand in a transverse plane across the axial passageway of the housing defined by the walls to close the axial passageway between the openings; and an adjustable limit stop axially adjacent the metallic shutter and adjustably positionable transversely across the axial passageway, the stop including one portion movable into the transverse plane in which the shutter expands resiliently to adjustably limit the resilient expansion of the shutter across the passageway and movable out of the transverse plane to permit unrestrained resilient expansion across the passageway.

7. An adjustable damper valve as defined in claim 6 wherein the adjustable limit stop includes a platform axially adjacent the shutter and transversely adjustable in the passageway, and a bracket pivotally mounted on the platform for movement into and out of the transverse plane in which the shutter expands.

8. An adjustable damper valve as defined in claim 6 wherein a frangible link is included in the adjustable limit stop and connects with the movable portion to hold the movable portion in the transverse plane in which the shutter expands.

9. An adjustable damper valve as defined in claim 8 wherein the frangible link is a fusible link permitting the movable portion to move out of the transverse plane at elevated temperatures.

10. An adjustable damper valve as defined in claim 8 wherein the frangible link is an explosive link.

11. An adjustable damper valve as defined in claim 6 wherein a guide rod extending in the transverse plane in which the shutter expands is mounted to the housing and engages the shutter for guiding the resilient shutter expansion.

12. An adjustable damper valve as defined in claim 11 wherein the adjustable limit stop includes a manually rotatable lead screw extending transversely across the passageway parallel to the guide rod engaging the shutter.

* * * * *